Figure 1:
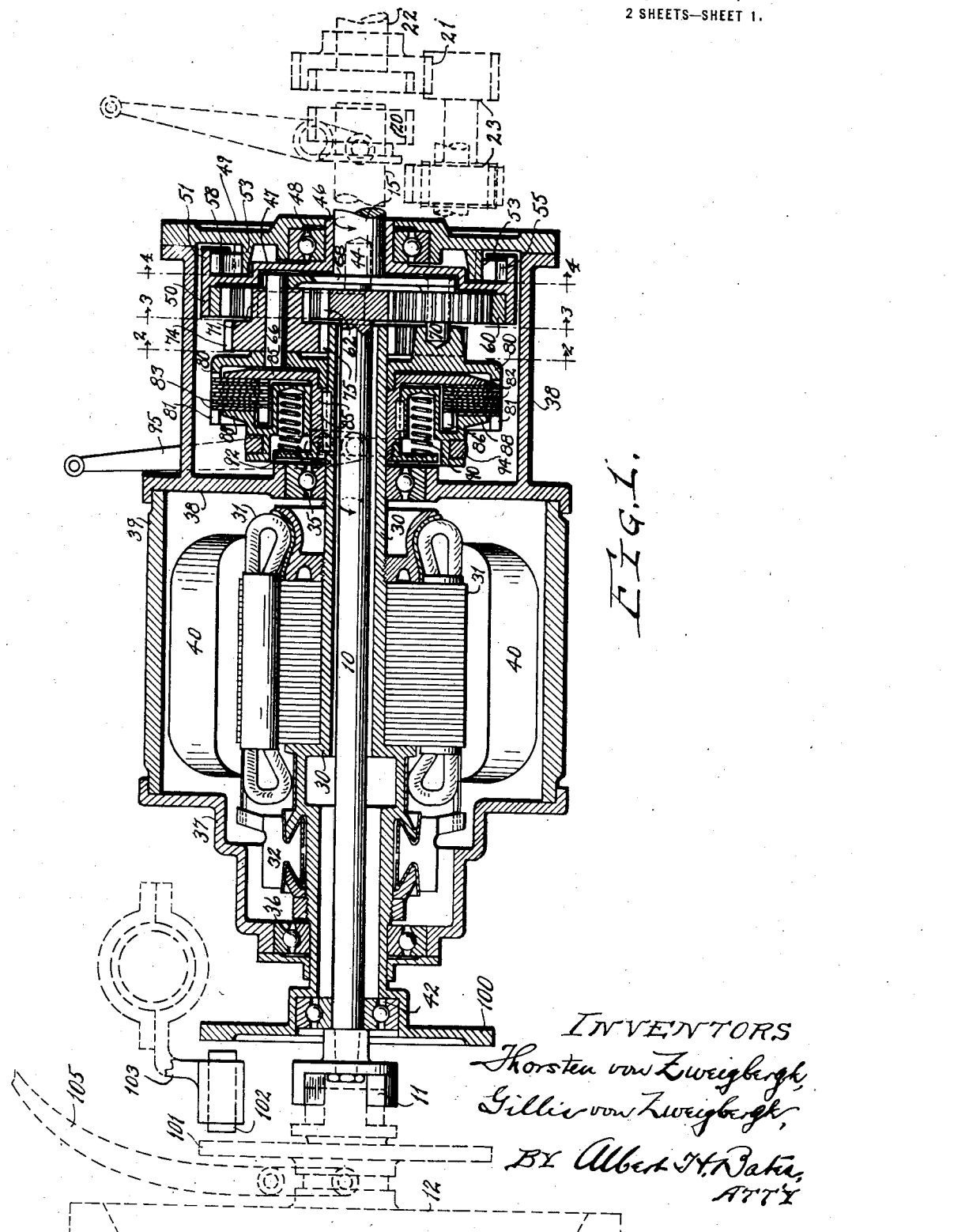

T. AND G. VON ZWEIGBERGK.
CHANGE SPEED GEARING.
APPLICATION FILED NOV. 1, 1915.

1,307,230.

Patented June 17, 1919.
2 SHEETS—SHEET 2.

INVENTORS,
Thorsten von Zweigbergk,
Gillis von Zweigbergk,
BY Albert H. Bates,
ATTY

UNITED STATES PATENT OFFICE.

THORSTEN VON ZWEIGBERGK, OF LANCASTER, AND GILLIS VON ZWEIGBERGK, OF FULWOOD, PRESTON, ENGLAND; SAID GILLIS VON ZWEIGBERGK ASSIGNOR TO SAID THORSTEN VON ZWEIGBERGK.

CHANGE-SPEED GEARING.

1,307,230.                 Specification of Letters Patent.     Patented June 17, 1919.

Application filed November 1, 1915. Serial No. 58,976.

*To all whom it may concern:*

Be it known that we, THORSTEN VON ZWEIGBERGK and GILLIS VON ZWEIGBERGK, citizens of the United States, residing at Lancaster, in the county of Lancaster, England, and at Fulwood, Preston, county of Lancaster, England, respectively, have invented a certain new and useful Improvement in Change-Speed Gearings, of which the following is a full, clear, and exact description, reference being had to the accompanying drawings.

This invention relates to change speed gearing for automobiles and the like, one of the objects being to provide a simple and effective means of electric control for passing from one speed to another which will enable the change to be made very smoothly and at the same time quickly and without requiring release of the power. In the preferred form of our invention we provide a system of planetary gearing adapted to give three speeds and combine this with a dynamo controlling the change from low to second speed, the dynamo being mounted concentrically about the engine shaft, and the planetary gearing rotating it in the opposite direction to the engine shaft. The dynamo is revolved idly and the transmission of power is purely mechanical at the low speed, the intermediate speed being attained by short circuiting the dynamo, which reacts through the planetary gearing to increase the driven rotation as the dynamo slows down. By gradually cutting out resistance, as the short circuiting is accomplished, the change of speed may be as gradual as desired. We prefer to reach the third speed by a friction clutch which may gradually clamp the engine shaft direct to the driven shaft; for example, by preventing relative movement of the planetary gears. The diminishing slippage of this clutch as it is applied makes a gradual change from intermediate to high gear, notwithstanding the change is quick.

By providing the purely mechanical drive for the low speed, which at the same time rotates the dynamo idle, the torque which the dynamo must take care of is much reduced, and, accordingly, a much smaller dynamo is available than if it had to take the torque on the low gear.

It is evident that the dynamo can be so wound and connected that it may serve as a motor in starting the engine and may also be used for charging a battery, either when the engine is running idle or driving on low or high gear.

A preferred form of our invention is hereinafter described in connection with the accompanying drawings, the essential characteristics being summarized in the claims.

Figure 2:
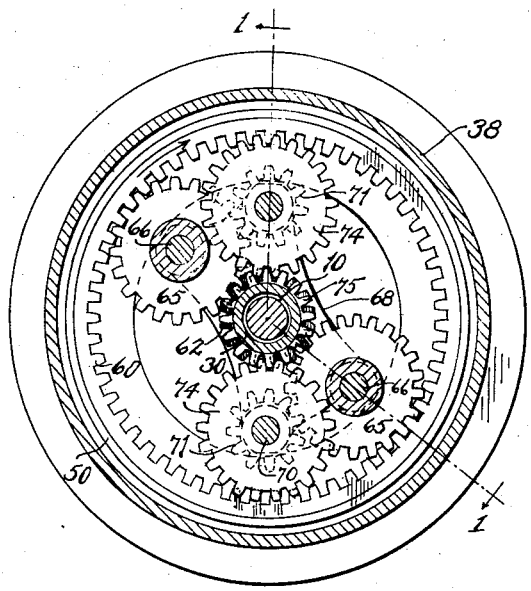
Figure 3:
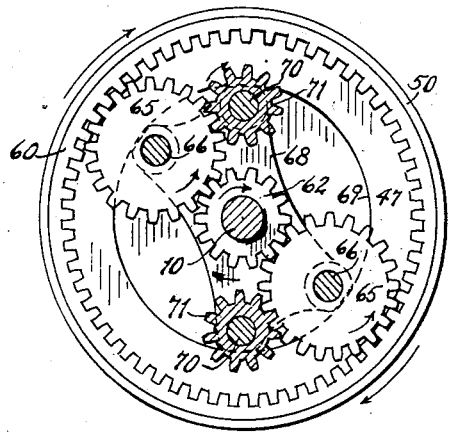
Figure 4:
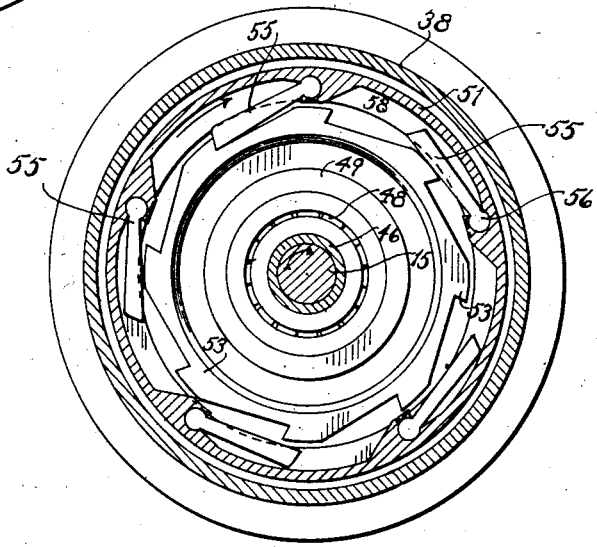
Figure 5:
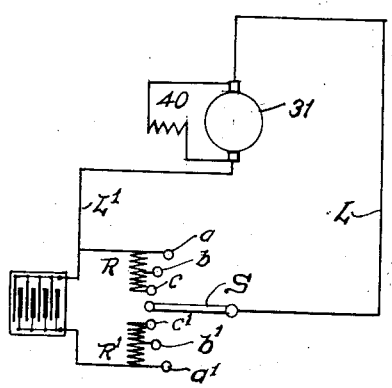

In the drawings, Figure 1 is a section along the axis of the drive shaft and driven shaft, the gearing portion being taken on two planes, as indicated by the line 1—1 on Fig. 2; Figs. 2, 3 and 4 are transverse sections as indicated by the lines 2—2, 3—3 and 4—4 on Fig. 1, all looking toward the right; Fig. 5 is a diagram illustrating the electrical control of the dynamo for second speed.

In Fig. 1, 10 indicates the main drive shaft, which may be coupled at its forward end 11 with a suitable clutch 12 (indicated in broken lines), adapted to connect the drive shaft with the the engine shaft. Alined with the driving shaft is the driven shaft 15. The arrows on these shafts indicate the direction of their rotation. Fig. 1 illustrates in broken lines a slidable gear 20, which may act as a dental clutch with a member 21 on a propeller shaft 22 of the vehicle, or may engage with reversing gear 23, of any desired construction, to cause the propeller shaft to rotate in opposite direction.

30 indicates a sleeve loosely surrounding the drive shaft 10 and carrying a suitable armature 31 and commutator 32. This sleeve is shown as mounted in ball bearings 35 and 36 carried by the parts 37 and 38 of the casing. An intermediate portion 39 of the casing carries field magnets 40 coöperating with the armature. The drive shaft is shown as mounted near its forward end in a ball bearing 42 carried in an extension of the sleeve, while the rear end of this shaft is reduced and extends into the driven shaft, as shown at 44. The driven shaft is embraced by the hub 46 of a wheel 47 (hereinafter fully described), and this hub is mounted in a ball bearing 48 carried by a frame plate 49, which is shown as secured to the wall of the casing 38.

The wheel 47 has its outer periphery opposite the extending flanges 50 and 51. The flange 51 overhangs a stationary ratchet wheel 53, which may be formed on the inner face of the plate 49 or otherwise carried by it, and the flange carries a series of pawls 55, adapted to co-act with the ratchet wheel. Fig. 4 shows the ratchet having several more teeth than there are pawls, and shows the uppermost of the pawls acting to engage the ratchet by gravity. The pawls are shown as having rounded heads 56 occupying correspondingly shaped recesses in bosses on the inner face of the flange, the pawls being slid in endwise and retained by a ring 58 secured to the flange. This ratchet construction as described, may be varied as desired, and is illustrative of any free wheel, that is a wheel which may revolve in one direction but not in the other, the revolution being free in the direction of rotation of the drive shaft.

The forward flange 50 of the free wheel 47, carries within it an internal gear 60. This gear is accordingly free to move in the direction of rotation of the drive shaft, and held against movement in the opposite direction. Formed on or carried by the drive shaft, is a central driving pinion 62 which constitutes a sun wheel, and between this sun and the internal gear 60, are one or more planet gears 65, meshing with both the sun and the internal gear. Two planets are shown, though the number may be varied as desired. These planets are journaled on studs 66 which project from a spider 68 rigidly mounted on the forward end of the driven shaft 15. This spider as shown has a plate accupying a central recess 69 in the free wheel 47.

With the sun and planet construction described, it will be evident that the internal gear constitutes a reaction member for the planets 65, rotated in the direction of the arrows in Fig. 3, and, accordingly, the rotation of the driving shaft causes the planets to travel, thereby rotating the spider 68 in the right-hand direction (Fig. 3), and giving the same rotation to the driven shaft, but with a much lower speed than the rotation of the drive shaft. This constitutes the low gear drive.

Secured to the spider 68 are one or more studs 70 on which are journaled pinions 71, meshing with the planet gears 65. Formed rigidly with these pinions are larger gears 74, which mesh with a central pinion 75 rigidly secured to the rear end of the sleeve 30. Accordingly, when the low gear is operated, the pinions 71—74, are bodily traveling and are also rotated in the right-hand direction, and this gives a left-hand rotation to the sleeve 30, which is accordingly revolved and rotated in the opposite direction to the drive shaft 10. Thus, on low gear, the armature revolves freely in the opposite direction to the drive shaft. Such movement is without effect on low gear so far as the driving is concerned, and is referred to herein as an idle movement, though the generator at such time, if desired, may be in use for generating current for charging the storage battery, etc.

To pass from low to intermediate or second gear, it is only necessary to retard the rotation which the armature has on low gear. This is very readily accomplished by short circuiting the armature. Suitable resistance is provided so that the short circuiting may be gradual and thus the retardation of the armature gradual. The effect of this retardation is as follows:

When the central wheel 75 cannot rotate as fast as the rotation of the driving shaft and the gearing described tends to drive it, it becomes a reaction member, holding back the rotation of the gears 74 and 71, and these hold back the rotation of the planets 65, which accordingly draw with them the internal gear 60 to the extent to which their rotation with reference to such gear is prevented. That is to say, if the armature were held immovable, the central gear 75 would be stationary, the gears 74 could only revolve as they travel bodily around the axis of the drive shaft, and this reduces the peripheral speed of rotation of the planets below the peripheral speed delivered by the driving pinion 62, wherefore the planets act to some extent as a transmitter of rotation from the driving pinion 62 to the internal gear 60, which thus overruns, the result being that the studs 66 carrying the pinions travel bodily at faster speed than before and thus second speed is transmitted to the driven shaft 15.

The effect of closing the circuit about the armature may be described as applying a brake to a revolving part of the sleeve 30. This braking action is as gradual as desired, owing to the gradual cutting out resistance. At the same time it may be accomplished very quickly, thus bringing the vehicle up to second speed within a minimum of time and very smoothly. It should be noted that this change from low to second speed is accomplished without throwing off the power, and thus the jerk incident to sliding or shifting gears is avoided.

To pass to high speed, it is simply necessary to clutch the driving and driven shafts together, causing these two shafts, the planetary gearing and the armature and sleeve to rotate as a unit, the free wheel overrunning and its pawls being kept out of engagement with the ratchet by centrifugal force. Fig. 1 shows a very simple and effective clutch of the multiple disk type for accomplishing this result. This clutch will now be described.

Loosely journaled on the sleeve 30 is a wheel 80, rigidly connected with the spider 68. Any suitable connection may be made, including preferably, the studs 66 and 70. 81 indicates an overhanging flange on the member 80 having longitudinal slots occupied by outward extensions of disks 82. Within the flange 81 is a member 85 surrounding and keyed to the sleeve 30. This member forms an abutment for one side of the set of disks and carries projections 86 engaging inner extensions of the alternate disks 83. Surrounding the hub of the member 85 and slidable longitudinally on it but compelled to rotate with it, is a member 88 which forms a clamp for the other side of the multiple disks. Accordingly by shifting the member 88 toward or from the member 85 the clutch is engaged or freed. We have shown springs 90 mounted in recesses carried by the member 88 and bearing against a flange 92 secured to the member 85. These springs accordingly tend to cause the engagement of the clutch. Disengagement may be accomplished by any suitable means drawing the member 88 toward the left. We have shown a collar 94 mounted in an annular groove in the member and connected with a suitable shifting lever 95.

From the above construction of clutch it will be seen that to pass from intermediate to high gear it is only necessary to release the lever 95 and allow the springs 90 to seat the clutch. This may be accomplished with gradual slippage so that the passage from intermediate to high gear is accomplished without jerk and while the power continues.

It is desirable when the engine is disconnected from the driving shaft to stop the rotation of the armature, preventing transmission of power by momentum, and accordingly we have provided a disk 100 at the forward end of the armature sleeve 30, and have provided a disk 101 on the clutch 12, and between these parts is a solid fiber block 102, slidably mounted in a suitable bracket 103 carried by the frame. Accordingly, when the clutch 12 is moved rearwardly (as it may be by its lever 105), the disk 101 engages the block 102 and shifts it rearwardly into engagement with the disk 100, thereby stopping the rotation of the armature.

It will be seen that the armature mounted and connected as described, not only acts as the speed control in passing from low gear to second speed, but may be utilized for any of the purposes for which a generator or motor may be used on an automobile. That is to say, the electric device when driven as a generator may charge a battery, while it may be so arranged as to be utilized as a motor in starting the engine. In such starting, if the clutch 12 is engaged and the clutch 20 out of engagement and the multiple disk clutch disengaged, a battery current transmitted to the motor may revolve the armature, and thus the drive shaft and engine shaft, cranking the engine. Our equipment therefore, provides a simple and effective self-starter.

Fig. 5 is a diagram illustrating the short circuiting of the electric machine. In this diagram 31 is the armature and 40 the field winding; B is a suitable storage battery; R and R' resistances, and S a switch. The switch is connected by a suitable line L with the motor, while another line from the line L' from the motor runs directly to the contact point $a$ and through the battery and contact point $a'$. These lines also pass through various portions of the resistances R and R' to the points $b$, $c$, $b'$ and $c'$ respectively.

In the low gear the switch stands as shown in Fig. 5 and thus the generator is idle. The change to intermediate gear is accomplished simply by moving the switch successively to the points $c$, $b$, $a$. To use the electric equipment as a self-starter the switch point S is moved in the opposite direction successively across the points $c'$, $b'$ and $a'$. It is to be understood that electric connections may be varied as desired from those shown in the diagram. This diagram illustrates simply a series-wound motor and suitable provision may be made for using a shunt-wound or compound-wound machine.

The terms "driving" and "driven" shafts, as used herein are relative terms and, if desired, the direction of drive from shaft to shaft may be reversed; that is to say, what has been termed the "driven" shaft may become the driving shaft, and vice versa. Various other changes may be made in the mechanism employed or equivalents substituted for the parts shown, without departing from our invention as summarized in the appended claims.

Having thus described our invention, what we claim is:

1. In a change speed gearing of the type described, the combination, with driving and driven members, of planetary gearing connecting them, an automatically applied ratchet control for said planetary gearing, and a dynamo the armature of which is driven idly mechanically at the low speed and so connected with a part of the gearing that the retarding of the dynamo increases the speed transmitted.

2. In change speed gearing, the combination of reaction gearing of the sun and planet type, a dynamo having its armature geared with a planet gear, another gear of said gearing geared with the planet gear, a ratchet for automatically holding said other gear against backward movement only whereby reaction is obtained against said other gear when the armature is rotating idly, and means for short circuiting the armature, thereby changing the reaction to the armature and allowing said other gear to overrun, whereby the rotation of the driven shaft is increased.

3. In change speed gearing, the combination of reaction gearing of the sun and planet type, a dynamo having its armature geared with a planet gear of said gearing, an internal gear meshing with the planet gear, a ratchet acting automatically for obtaining reaction against said internal gear when the armature is rotating idly, and means for short circuiting the armature.

4. In a change speed gear, the combination of a sun gear, a coacting planet gear, another gear engaged with the planet gear, an automatically applied ratchet control for said other gear, a dynamo having its armature geared with the planet gear, and means for short circuiting the armature.

5. The combination with a driving shaft of a sun gear, a planet gear meshing therewith, another gear with which the planet gear engages, an automatically applied ratchet control for said other gear, and a dynamo concentric with the driving shaft and having its armature geared with the planet gear, said armature when free and idle rotating oppositely to the driving shaft.

6. A change speed gear comprising a sun gear, a planet gear meshing therewith, an internal gear with which the planet gear meshes, an automatically applied ratchet control for the internal gear, a dynamo having its rotary member geared with the planet gear, and means for short circuiting the dynamo.

7. In a change speed gearing the combination of a driving shaft, a driven shaft, a sun gear on the driving shaft, a planet for the sun gear connected with the driven shaft, an internal gear meshing with the planet gear, a ratchet device preventing the movement of the internal gear in one direction but allowing it to revolve in the opposite direction, a dynamo, the armature of which is mounted concentrically about the driving shaft and is geared with the planet gear, whereby the dynamo is driven in the opposite direction from the driving shaft when the internal gear is stationary, and means for short circuiting the armature to retard its rotation and thereby drive the internal gear in a direction allowed by the ratchet.

8. A change speed gear comprising a sun gear, another gear, and a planet gear engaged with them both, an automatically applied ratchet control for said other gear, a rotatable device geared with the planet gear, and means for applying a brake to the rotatable device.

9. A change speed gear comprising a sun gear, an internal gear concentric therewith, and a planet gear between the two meshing with them both, a ratchet device limiting the rotation of the internal gear to one direction, a rotatable device geared with the planet gear, and means for applying a brake to the rotatable device.

10. The combination, with driving and driven shafts, of a change speed gear comprising a sun gear, another gear, and a planet gear engaged with them both, an automatically applied ratchet control for said other gear, a rotatable device geared with the planet gear and mounted concentrically about the driving shaft, and means for applying a brake to the rotatable device.

11. The combination with driving and driven shafts, of a change speed gear comprising a sun gear, an internal gear concentric therewith, and a planet gear between the two meshing with them both, an automatically applied ratchet control for the internal gear, a rotatable device geared with the planet gear and mounted concentrically about the driving shaft, and means for applying a brake to the rotatable device.

12. In a three speed change gearing, the combination of a driving shaft, a driven shaft, a sun gear on the driving shaft, a planet gear connected with the driven shaft, another gear engaged with the planet gear and provided with an automatically applied ratchet control, a dynamo having its armature geared with the planet gear and adapted to be short circuited to retard its rotation and thereby rotate said other gear, and a clutch adapted to connect the driving and driven shafts.

13. In a change speed gearing with a driving and a driven shaft, the combination of a sun gear, an internal gear, a planet gear meshing with the sun gear and internal gear, and connected to the driven shaft, a dynamo geared with the planet gear, an automatically applied ratchet control for the internal gear, and means for short circuiting the dynamo and subsequently clutching the driving and driven shafts together.

14. In a three speed change gearing, the combination of a driving shaft, a driven shaft, a sun gear on the driving shaft, a planet gear connected with the driven shaft, an internal gear meshing with the planet gear and provided with a ratchet, a rotatable device geared with the planet gear and when idle running in opposite direction to the driving shaft, means for applying a brake thereon, and means for clutching the driving and driven shafts together.

15. In a change speed gearing the combination of a driving shaft, a driven shaft, a sun gear on the driving shaft, a planet for the sun gear connected with the driven shaft, another gear meshing with the planet gear, an automatically applied ratchet control preventing the movement of said other gear in one direction but allowing it to revolve in the opposite direction, a dynamo, the armature of which is geared with the planet gear, whereby the armature is driven in the opposite direction from the driving shaft when said other gear is stationary, means for short circuiting the armature to retard its rotation and thereby drive said other gear in a direction allowed by the ratchet, and means for clutching the armature to the driving shaft to effect third speed.

16. A three speed change gear comprising a driving and a driven shaft, a sun gear on the driving shaft, a planet gear on the driven shaft, an internal gear meshing with the planet gear and having a ratchet connection with a stationary member, a sleeve surrounding the driving shaft, an armature on said sleeve geared with the planet gear and adapted to be driven idly and in opposite direction to the driving shaft for low speed, means for short circuiting the armature, thus causing it to act as a brake and transmitting motion to the internal gear in the direction allowed by the ratchet thereof, and means for clutching the armature sleeve and driving shaft together for the third speed.

17. The combination, with change speed reaction gearing, having a rotary pinion-carrying casing, of a driven shaft rigid with said casing, a stationary member with which said casing has a ratchet connection, a dynamo having its armature geared with said gearing, a battery, and means for connecting the same with the dynamo to drive it as a motor.

18. The combination with a driving shaft, a sun gear thereon, a planet gear, a driven shaft, a connection between the planet gear and driven shaft, of an internal gear, a ratchet holding the internal gear against movement in the direction opposite to that of the engine shaft, a sleeve surrounding the engine shaft, a dynamo having its armature on said sleeve, a central gear on said sleeve, a pinion meshing with said central gear and geared with the planet gear mentioned, and a clutch adapted to connect said sleeve immovably to the gearing described.

19. The combination with a driving shaft, a sun gear thereon, a planet gear, a driven shaft, a connection between the planet gear and driven shaft, another gear, an automatically applied ratchet control for said other gear, a sleeve surrounding the engine shaft, a dynamo having its armature on said sleeve, a central gear on said sleeve, a pinion meshing with said central gear and geared with the planet gear mentioned, and a clutch concentric of said sleeve and having one member connected to the sleeve and the other member connected with the driven shaft.

20. In a change speed gearing, the combination of alined driving and driven shafts, a sun gear on the driving shaft, a planet for the sun gear, a stud carried by the driven shaft on which the planet is mounted, an internal gear meshing with the planet gear, a stationary ratchet wheel, a pawl coacting therewith and carried by the internal gear, a sleeve surrounding the driving shaft, an armature on said sleeve, a gear on said sleeve geared with the planet gear, means for short circuiting the armature thus causing it to act as a brake and transmitting motion to the internal gear in the direction allowed by the ratchet thereof, and means for clutching the armature sleeve and driving shaft together for the third speed.

In testimony whereof we hereunto affix our signatures.

THORSTEN von ZWEIGBERGK.
GILLIS von ZWEIGBERGK.